United States Patent
Lee et al.

(10) Patent No.: US 8,663,566 B2
(45) Date of Patent: Mar. 4, 2014

(54) FLUIDIZED BED WATER GAS SHIFT MEMBRANE FOR SIMULTANEOUS $CO_2$ SEPARATION AND $CO_2$ SEPARATION METHOD USING THE SAME

(75) Inventors: See Hoon Lee, Daejeon (KR); Il Hyun Baek, Daejeon (KR); Won Hyun Eom, Daejeon (KR); Jeong Nam Kim, Daegu (KR)

(73) Assignee: Korea Institute of Energy Research (KR)

( * ) Notice: Subject to any disclaimer, the term of this patent is extended or adjusted under 35 U.S.C. 154(b) by 881 days.

(21) Appl. No.: 12/838,621

(22) Filed: Jul. 19, 2010

(65) Prior Publication Data
US 2011/0286901 A1    Nov. 24, 2011

(30) Foreign Application Priority Data
May 19, 2010    (KR) ........................ 10-2010-0047001

(51) Int. Cl.
*B01J 8/18*    (2006.01)
(52) U.S. Cl.
USPC ........................... 422/139; 422/626; 423/656
(58) Field of Classification Search
USPC .................................. 422/139, 626; 423/656
See application file for complete search history.

(56) References Cited

U.S. PATENT DOCUMENTS

| | | | | |
|---|---|---|---|---|
| 2,438,029 | A | * | 3/1948 | Atwell ........................... 518/712 |
| 2,960,388 | A | * | 11/1960 | Johnson et al. ............... 423/656 |
| 3,666,682 | A | * | 5/1972 | Muenger ....................... 252/373 |
| 2007/0240566 | A1 | * | 10/2007 | Benn et al. ........................ 95/56 |
| 2007/0243127 | A1 | * | 10/2007 | Fedorov et al. ............. 423/648.1 |

FOREIGN PATENT DOCUMENTS

| KR | 10-2004-0036106 | 4/2004 |
|---|---|---|
| KR | 10-2005-0103568 | 11/2005 |
| KR | 10-2006-0007574 | 1/2006 |
| KR | 10-0816879 | 3/2008 |

* cited by examiner

*Primary Examiner* — Walter D Griffin
*Assistant Examiner* — Huy-Tram Nguyen
(74) *Attorney, Agent, or Firm* — Cantor Colburn LLP

(57) ABSTRACT

Disclosed are a fluidized bed water gas shift membrane reactor and a method for separating carbon dioxide using the same. More specifically, disclosed are a fluidized bed water gas shift membrane reactor provided on the back of a gasification reactor to produce a synthetic gas consisting of hydrogen and carbon monoxide by reaction of a solid hydrocarbon with water or oxygen, wherein the carbon monoxide present in an amount of 40 to 70 vol % in the synthesis gas reacts with steam in the presence of a catalyst to produce a mix gas of hydrogen and carbon dioxide, and the hydrogen is selectively isolated from the mix gas through a Pb—Cu shift membrane to increase the concentration of carbon dioxide present in the mix gas and separate the carbon dioxide, and a method for separating carbon dioxide using the same.

3 Claims, 3 Drawing Sheets

FLUIDIZED BED WATER GAS SHIFT MEMBRANE FOR SIMULTANEOUS CO$_2$ SEPARATION AND CO$_2$ SEPARATION METHOD USING THE SAME

BACKGROUND OF THE INVENTION

1. Field of the Invention

The present invention relates to a fluidized bed water gas shift membrane reactor and a method for separating carbon dioxide using the same. More specifically, the present invention relates to a fluidized bed water gas shift membrane reactor provided on the back of a gasification reactor to produce a synthetic gas consisting of hydrogen and carbon monoxide by reaction of a solid hydrocarbon with water or oxygen, wherein the carbon monoxide present in an amount of 40 to 70 vol % in the synthesis gas reacts with steam in the presence of a catalyst to produce a mix gas of hydrogen and carbon dioxide, and the hydrogen is selectively isolated from the mix gas through a Pb—Cu shift membrane to increase the concentration of carbon dioxide present in the mix gas and separate the carbon dioxide, and a method for separating carbon dioxide using the same.

2. Description of the Related Art

In an attempt to solve recent problems such as global warming and rapid depletion of energy resources such as oil or natural gas, gasification to convert solid hydrocarbon materials such as fuels, waste materials, and biomass into synthetic gases as clean energies comes into the spotlight.

Gasification enables mass-production of hydrogen which is known as the most environmentally-friend energy source and low-cost treatment of greenhouse gases, as compared to conventionally-used combustion. Based on these advantages of gasification, many enterprises are attempting to develop gasification techniques. However, current processes for converting most of synthetic gases consisting of hydrogen and carbon monoxide into hydrogen and for separating carbon dioxide in the synthetic gas are generally complicated and entail high costs.

In addition, in the process of production of hydrogen using gasification, carbon monoxide is yielded in an amount more than hydrogen, depending on factors such as the type of solid hydrocarbon materials, gasifying agents, the type of reactors and operation conditions, and carbon dioxide is yielded in a low amount of 5-10 vol % and 15-30 vol % for dry-type gasification and wet-type gasification, respectively, and the ingredient present in the highest amount, 40-70 vol %, in the synthetic gas, is carbon monoxide.

Accordingly, development of processes for converting carbon monoxide contained in the synthetic gas into carbon dioxide and hydrogen in order to convert solid hydrocarbon materials into clean energies using gasification, and separating highly concentrated carbon dioxide is required.

The generally-used method for converting carbon monoxide into hydrogen is a fixed-bed water gas process wherein carbon monoxide reacts with vapor in the presence of catalysts, which is unsuitable for application to synthetic gases which contain 40-70 vol % of carbon monoxide. In addition, this method requires installation of additional equipment such as carbon dioxide absorbing tops which is currently developed to separate carbon dioxide, thus entailing an increase in gasification costs.

That is, Korean Patent Nos. 0612956 and 0462286 related to conventional water gas reactions are directed to water gas catalysts and Korean Patent No. 0816879 discloses a membrane reactor simultaneously performing water vapor modification and carbon monoxide removal, and a method for preparing hydrogen using the same. Also, Korean Patent Application No. 2004-0056403, related to a shift membrane similar to the present invention, discloses hydrogen production using a shift membrane reactor through conversion of dimethylether, which disadvantageously cannot solve problems associated with conversion into clean energy through gasification.

Accordingly, in order to produce clean energy resources through gasification of solid hydrocarbon materials, and separate and store carbon dioxide at low costs, a single gas reactor in which high-concentration carbon monoxide reacts with vapor to produce a mix gas containing an increased concentration of carbon dioxide, and hydrogen is separated from the mix gas to increase the concentration of carbon dioxide and a method for separating carbon dioxide using the same are required.

SUMMARY OF THE INVENTION

Therefore, the present invention has been made in view of the above problems, and it is one object of the present invention to provide a fluidized bed water gas shift membrane reactor for separating carbon dioxide and a method for preparing carbon dioxide using the same, wherein carbon monoxide present in an amount of 40-70% by volume in a synthetic gas prepared by gasification of solid hydrocarbon materials reacts with vapor in the presence of a water gas catalyst to convert carbon monoxide into carbon dioxide and hydrogen, and at the same time, the volume of carbon dioxide is concentrated to a level of 65% or higher using a Pd—Cu-based shift membrane, thereby highly efficiently realizing separation of carbon dioxide and production of hydrogen.

In accordance with one aspect of the present invention, provided is a fluidized bed water gas shift membrane reactor for simultaneously separating carbon dioxide, by reacting carbon monoxide in a synthetic gas with steam in the presence of a fluidized catalyst to produce hydrogen and carbon dioxide, and separating the hydrogen to concentrate the carbon dioxide, the reactor including: a reaction chamber partitioned into a lower-layer inlet portion, an intermediate-layer reaction portion and an upper-layer separation portion through a diffuser and a shift membrane, the reaction chamber provided with a catalyst layer arranged on the diffuser catalyst to allow fluidization to be realized using a fluidization gas supplied from the lower-layer inlet portion; a synthetic gas supply pipe and a steam supply pipe communicating with the lower-layer inlet portion, to supply synthetic gas and steam as catalyst fluidization gases; a hydrogen exhaust pipe communicating with the top of the upper-layer separation portion to discharge hydrogen separated by the shift membrane; and a mix gas outlet pipe communicating with the top of the intermediate-layer reaction portion to discharge hydrogen-free high-concentrate carbon dioxide.

In accordance with another aspect of the present invention, provided is a method for separating carbon dioxide using a fluidized bed water gas shift membrane reactor, wherein the reactor is partitioned into a lower-layer inlet portion, an intermediate-layer reaction portion and an upper-layer separation portion through a diffuser and a shift membrane, wherein hydrogen produced by fluidization catalysis in the intermediate-layer reaction portion is separated through the shift membrane to collect concentrated carbon dioxide using the reactor, the method including: supplying a synthetic gas containing a great amount of carbon monoxide and steam to the lower-layer inlet portion of the reactor; spraying the synthetic gas and steam as fluidization gasses through the diffuser to fluidize the catalyst deposited on the intermediate-layer reaction portion and thus realize catalysis, thereby converting carbon monoxide of the synthetic gas into a mix gas of hydrogen and carbon dioxide; transferring hydrogen separated selectively from the mix gas through the shift membrane to the upper-layer separation portion, to concentrate carbon dioxide in the mix gas; and discharging hydrogen of the upper-layer separation portion separated through the shift membrane and the carbon dioxide mix gas concentrated in the intermediate-layer reaction portion by hydrogen separation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described with reference to the annexed drawings in more detail.

The fluidized bed water-gas shift membrane reactor 10 for simultaneously separating carbon dioxide is arranged on the back of a gasification reactor wherein a synthetic gas consisting of hydrogen and carbon monoxide (generated by reaction of solid hydrocarbon materials such as fuels, waste materials or biomass with water or oxygen), and carbon dioxide and hydrogen sulfide is produced.

Figure 1:
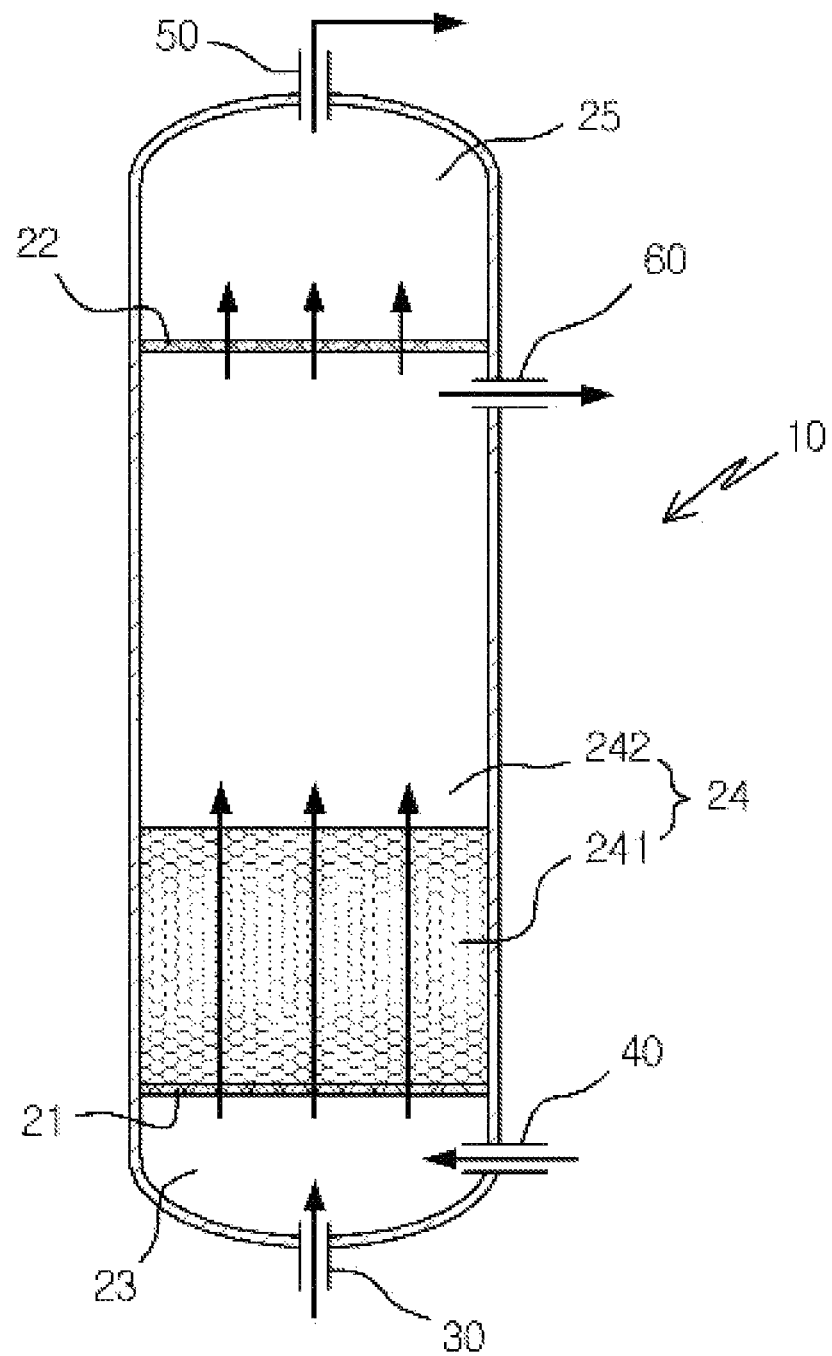
FIG. 1 is a schematic view illustrating a fluidized bed water gas shift membrane reactor according to the present invention.

As shown in FIG. 1, the reactor 10 is provided with a reaction chamber 20 which is partitioned into a lower-layer inlet portion 23, an intermediate-layer reaction portion 24 and an upper-layer separation portion 25 through a diffuser 21 and a shift membrane 22.

The lower-layer inlet portion 23 of the reaction chamber 20 communicates with a synthetic gas supply pipe 30 and a steam supply pipe 40, thus enabling incorporation of the synthetic gas and high-temperature steam. The steam supplied to the steam supply pipe 40 is generated by a steam generator including a pre-heater or a heater, or is derived from stream generated in an additional process.

The synthetic gas and steam supplied to the lower-layer inlet portion 23 are homogeneously supplied through the diffuser 21 to the intermediate-layer reaction portion 24. The mixture of synthetic gas and steam supplied to the intermediate-layer reaction portion 24 fluidizes catalysts laminated on the diffuser, and the intermediate-layer reaction portion 24 is divided into an intermediate-layer reaction portion 241, a region in which catalysts are fluidized, and a free board region 242, a region in which only gases are moved without any catalyst. In addition, a mix gas outlet pipe 60, which is arranged on the free board region present on the intermediate-layer reaction portion, communicates with the side close to the shift membrane 22 and enables exhaust of the mix gas containing highly-concentrated carbon dioxide obtained by removing hydrogen from the mix gas containing a great amount of hydrogen and carbon dioxide using the shift membrane 22, mentioned below.

It is preferred to use a catalyst having a diameter of 150 to 300 μm in order to promote fluidization. Representative catalysts are high temperature shift (HTS) catalysts and low temperature shift (LTS) catalysts to efficiently convert carbon monoxide into hydrogen and carbon dioxide.

Then, the shift membrane 22 to partition the upper-layer separation portion 25 and the intermediate-layer reaction portion 24 separates only hydrogen of the mix gas present in the intermediate-layer reaction portion and representative shift membranes are Pb—Cu-based shift membranes. The upper-layer separation portion, to which a great amount of hydrogen is supplied by the shift membrane, communicates with a hydrogen exhaust pipe 50 to enable separate exhaust of high-purity hydrogen.

Different pressures are supplied to the intermediate-layer reaction portion 24 and the upper-layer separation portion 25, to induce pressure difference in therebetween. The intermediate-layer reaction portion may be at a pressure of 10 atm or higher, preferably 10 to 50 atm, and the upper-layer separation portion may be at atmospheric pressure or less (a negative pressure, preferably, −0.1 atm), enabling hydrogen to be trapped by the shift membrane in the upper-layer separation portion due to difference in pressure. The negative pressure of the upper-layer separation portion can be formed using an auxiliary apparatus such as vacuum pump. Although not illustrated, a heating or heat-retaining means may be provided outside the reaction chamber.

Figure 2:
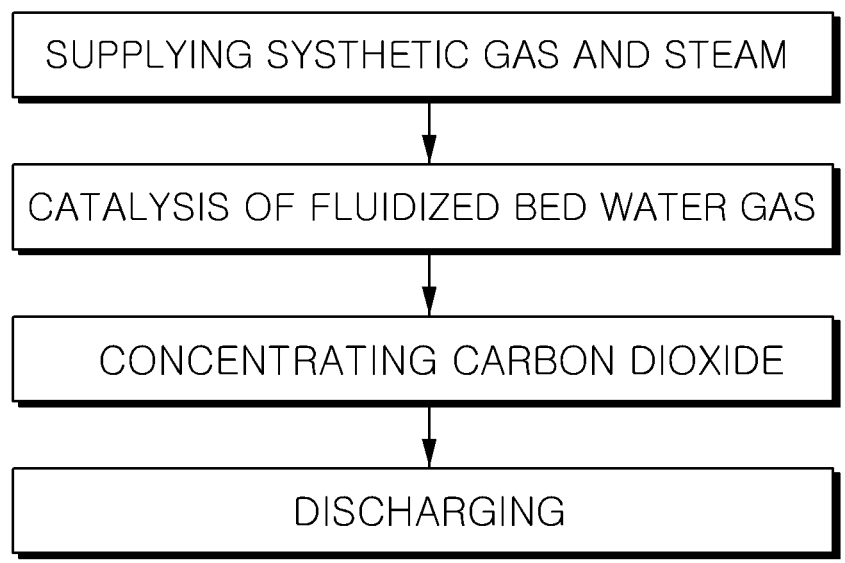
FIG. 2 is a flow chart illustrating a process for separating carbon dioxide according to the present invention.

Meanwhile, a method for separating carbon dioxide using the fluidized bed water gas shift membrane reactor will be illustrated with reference to FIG. 2.

In accordance with the method for separating carbon dioxide of the present invention, a synthetic gas containing a great amount of carbon monoxide and steam are supplied to the lower-layer inlet portion of the reactor. The synthetic gas supplied in the supply process contains 40 to 70% by volume of carbon monoxide obtained by reaction of hydrocarbons with water or oxygen. Such a synthetic gas containing a great amount of carbon monoxide and steam is mixed in the lower-layer inlet portion and then sprayed through the diffuser to the intermediate-layer reaction portion.

Then, catalysis of a fluidized bed water gas is performed. In this process, carbon monoxide reacts with steam in the presence of a catalyst at a high temperature to produce hydrogen and carbon dioxide.

The synthetic gas and steam sprayed through the diffuser act as fluidizing gases to fluidize the catalyst. The fluidization of the catalyst improves contact of the synthetic gas and steam and thus activates catalysis. Catalysis is carried out in the range of 200° C. to 450° C. This temperature range may be varied according to the catalyst used. However, this range secures high conversion of carbon dioxide and hydrogen.

For example, in the fluidized catalyst, the synthetic gas and steam are catalyzed to convert 40 to 70% by volume of carbon monoxide contained in the synthetic gas into 55 to 65% by volume of hydrogen and 35 to 45% by volume of carbon dioxide.

Then, carbon dioxide is concentrated. In this process, only hydrogen is selectively separated from the mix gas consisting of hydrogen and carbon dioxide to increase the concentration of carbon dioxide present in the mix gas.

This selective separation is realized by the difference in pressure between the intermediate-layer reaction portion and the upper-layer separation portion which are partitioned by the shift membrane. For example, the synthetic gas and steam supply portions and the lower shift membrane are kept at a high pressure of 10 to 50 atm, and the upper-layer separation portion is maintained at a low pressure ranging from atmospheric pressure to a negative pressure of −0.1 atm, thus enabling the shift membrane to absorb the high-pressure gases of the intermediate-layer reaction portion. Accordingly, the mix gas transferred from the catalyst fluidized bed to the free board region is absorbed in the shift membrane due to the pressure difference, and only hydrogen is passed and thus separated due to selectivity of the shift membrane, and a ratio of carbon dioxide present in the mix gas is increased. As a result, the concentration is realized.

Also, the Pd—Cu-based shift membrane of the upper-layer separation portion allows maintenance of an operating temperature of 350 to 400° C. at which hydrogen is separated, thereby uniformly maintaining passage of the shift membrane and providing uniform separation performance.

After the concentration of carbon dioxide, hydrogen of the upper-layer separation portion separated by the shift membrane, and the carbon dioxide mix gas of the intermediate-layer reaction portion concentrated by hydrogen separation are discharged, respectively, to separately collect hydrogen and high-concentration carbon dioxide.

Hereinafter, the present invention will be illustrated with reference to the following example.

Example 1

Measurement Concentration Variation of Carbon Dioxide at Various Reaction Pressures The shift membrane reactor herein used was the reactor according to the present invention and the shift membrane herein used was a Pd—Cu-based shift membrane.

The reactor has an inner diameter of 3.6 cm, and the shift membrane has an area of 70 cm$^2$.

The synthetic gas generated by gasification generally contains 40 to 70 vol % of carbon monoxide, 25 to 40 vol % of hydrogen and 5 to 20 vol % of carbon dioxide, but is present in a mix gas containing 40 vol % of carbon dioxide and 60 vol % of hydrogen, obtained by the water gas reaction. In this example, a mix gas containing 40 vol % of carbon dioxide and 60 vol % of hydrogen was used.

Hydrogen is removed from the mix gas through the shift membrane (upper-layer separation portion temperature of 350° C.) and carbon dioxide is thus concentrated.

Figure 3:
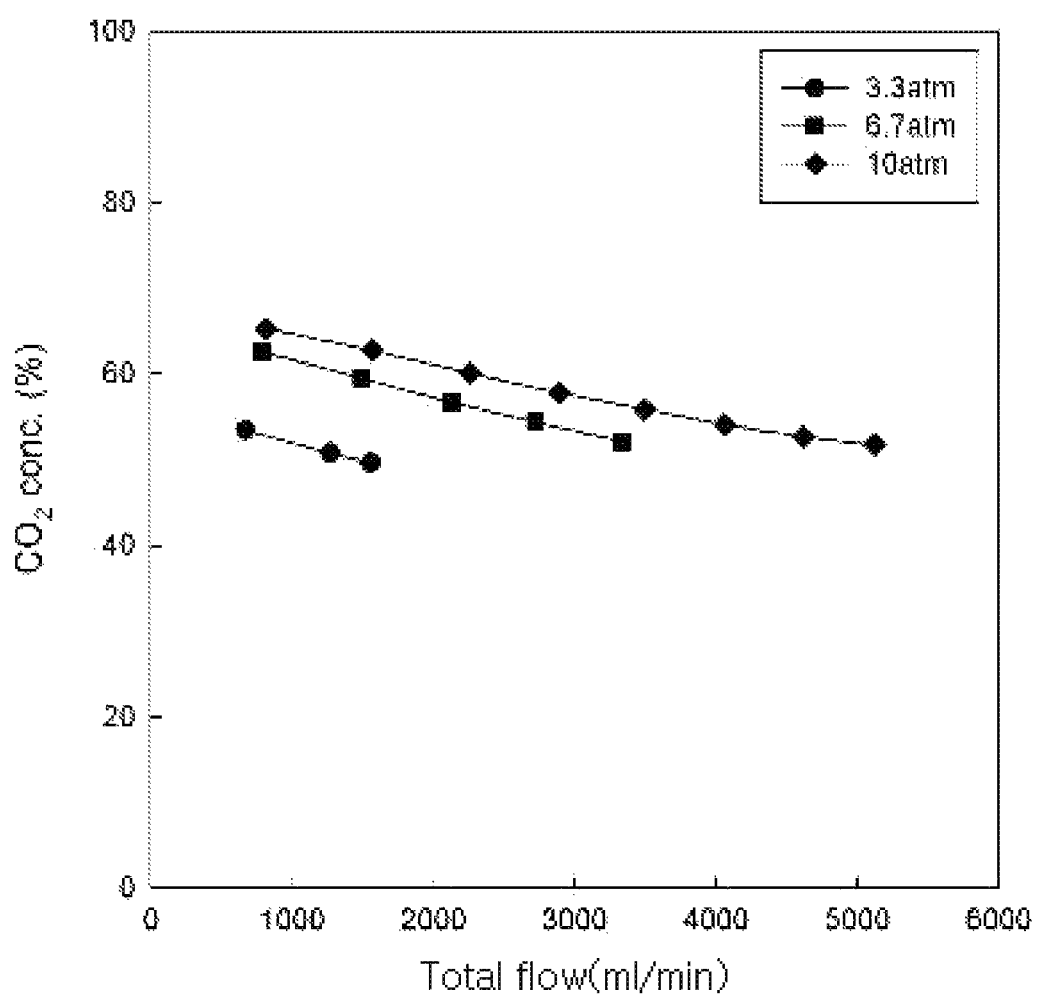
FIG. 3 is a graph showing carbon dioxide concentration at various pressures of a mix gas according to one embodiment of the present invention.

At this time, the concentration level of carbon dioxide with variations of the pressure of the mix gas is shown in FIG. 3.

As can be seen from FIG. 3, the concentration level of the carbon dioxide is varied depending on the pressure of mix gas at the constant pressure, and carbon dioxide is more concentrated with an increase of pressure and is increased up to the concentration level of about 70%.

However, when the structure of the Pd—Cu shift membrane and the operating temperature are varied, the concentration of carbon dioxide can be increased to a level of 90%.

As apparent from the afore-going, the present invention provides a fluidized bed water gas shift membrane reactor and a method for separating carbon dioxide using the same, wherein a synthetic gas generated by gasification of solid hydrocarbon is mixed with steam to convert carbon monoxide into a mix gas of hydrogen and carbon dioxide in the presence of a fluidized catalyst and hydrogen is selectively separated from the mix gas through a Pb—Cu shift membrane to increase the concentration of carbon dioxide present in the mix gas.

Also, the present invention provides a useful single reactor to perform generation of the mix gas and collection of high-concentration carbon dioxide by selective separation of hydrogen, thereby reducing installation area of equipment and collecting high-concentration carbon dioxide at a low cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fluidized bed water gas shift membrane reactor for simultaneously separating carbon dioxide, by reacting carbon monoxide in a synthetic gas with steam in the presence of a fluidized catalyst to produce hydrogen and carbon dioxide, and separating the hydrogen to concentrate the carbon dioxide, the reactor comprising:
a reaction chamber partitioned into a lower-layer inlet portion, an intermediate-layer reaction portion and an upper-layer separation portion through a diffuser and a shift membrane, the reaction chamber provided with a catalyst layer arranged on the diffuser catalyst to allow fluidization to be realized using a fluidization gas supplied from the lower-layer inlet portion;
a synthetic gas supply pipe and a steam supply pipe communicating with the lower-layer inlet portion, to supply synthetic gas and steam as catalyst fluidization gases;
a hydrogen exhaust pipe communicating with the top of the upper-layer separation portion to discharge hydrogen separated by the shift membrane; and
a mix gas outlet pipe communicating with the top of the intermediate-layer reaction portion to discharge hydrogen-free high-concentrate carbon dioxide.

2. The reactor according to claim 1, wherein the shift membrane is a Pb—Cu-based shift membrane.

3. The reactor according to claim 1, wherein the intermediate-layer reaction portion has a pressure of 10 to 50 atm, and the upper-layer separation portion has an atmospheric pressure or a negative pressure of −0.1 atm.

* * * * *